April 13, 1937.  C. A. BALLACK ET AL  2,076,523
HARVESTER-THRESHER
Filed Aug. 13, 1934  4 Sheets-Sheet 1
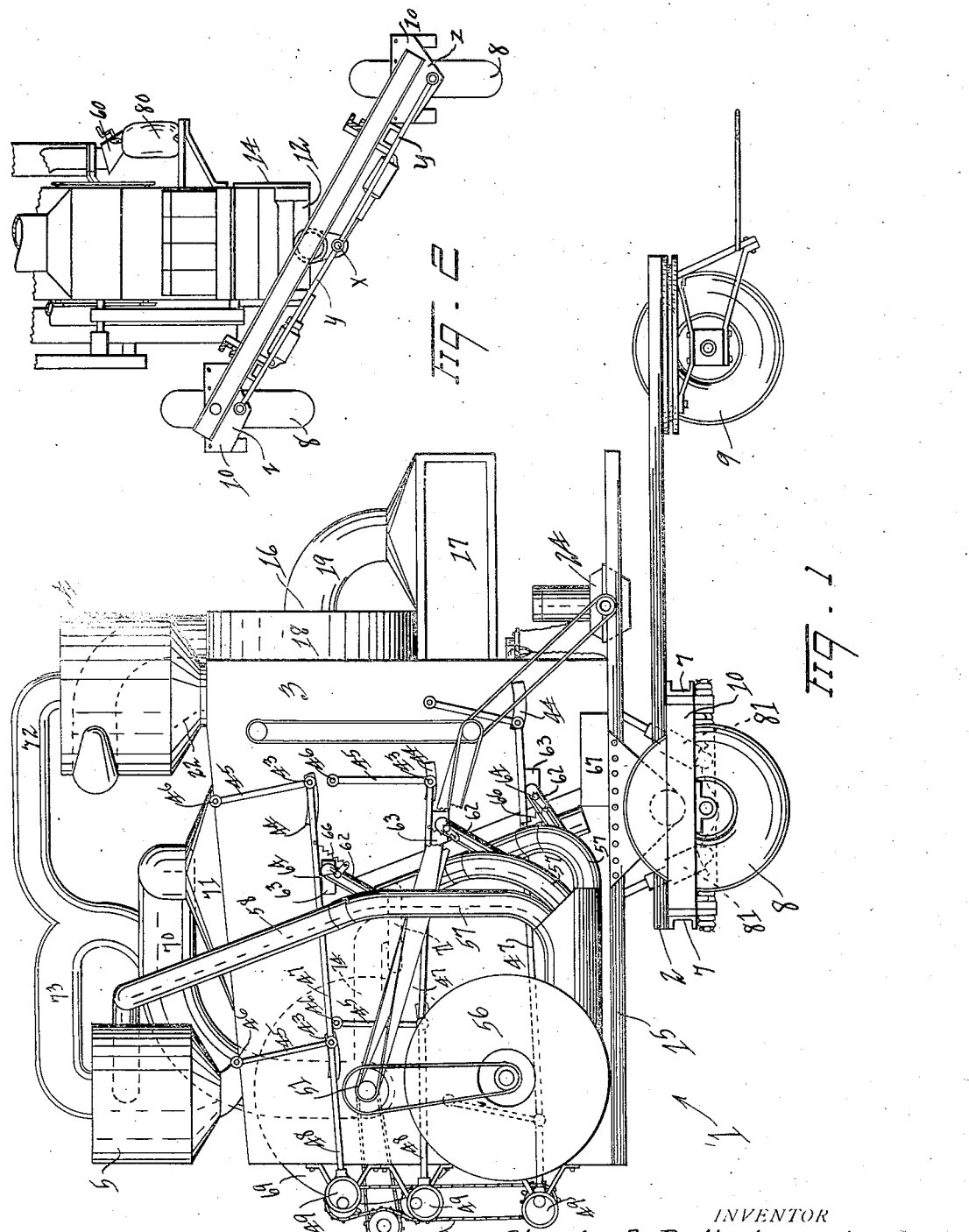
INVENTOR
Charles A. Ballack and
William C. Steele.
BY
E E Sauze
ATTORNEY

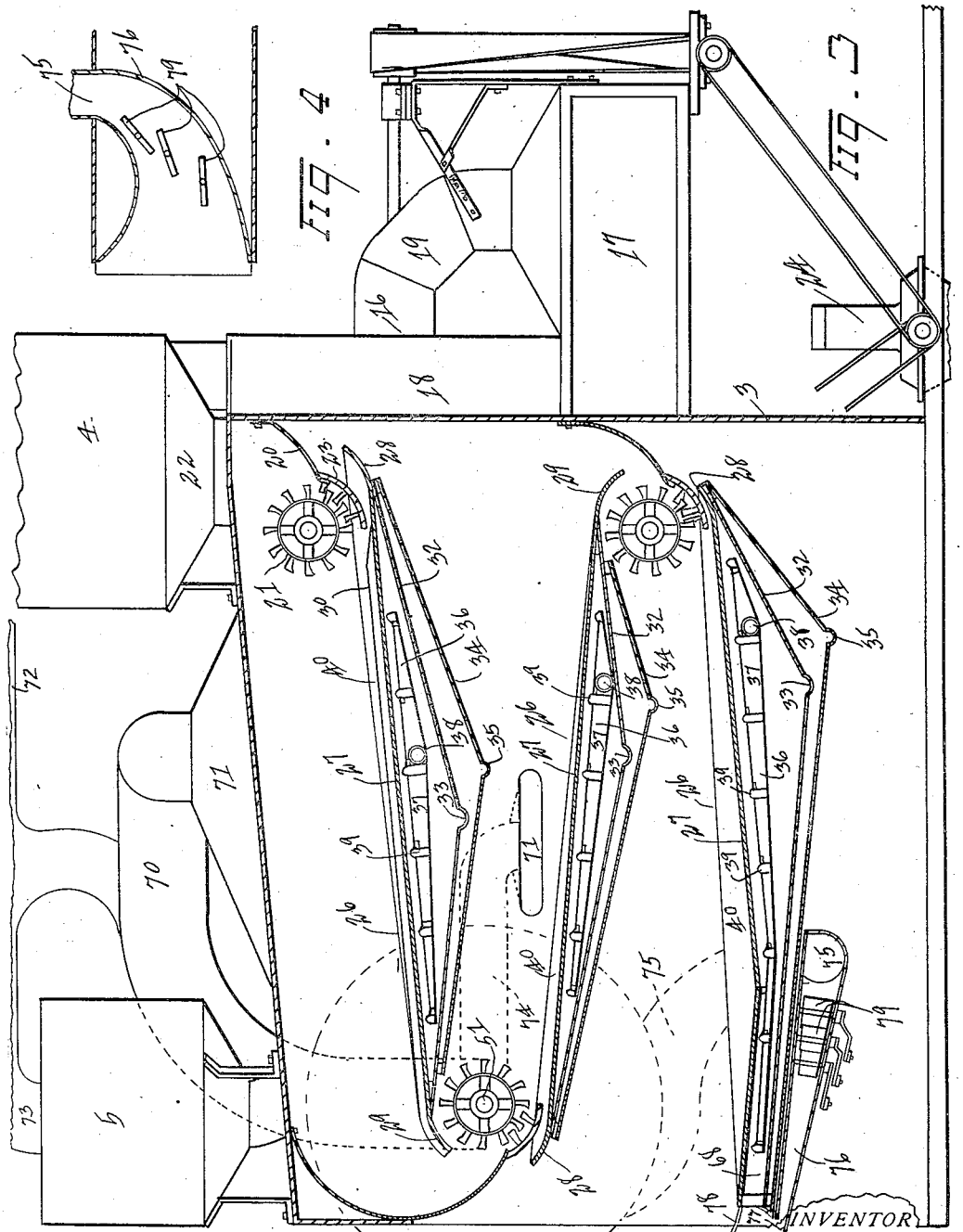

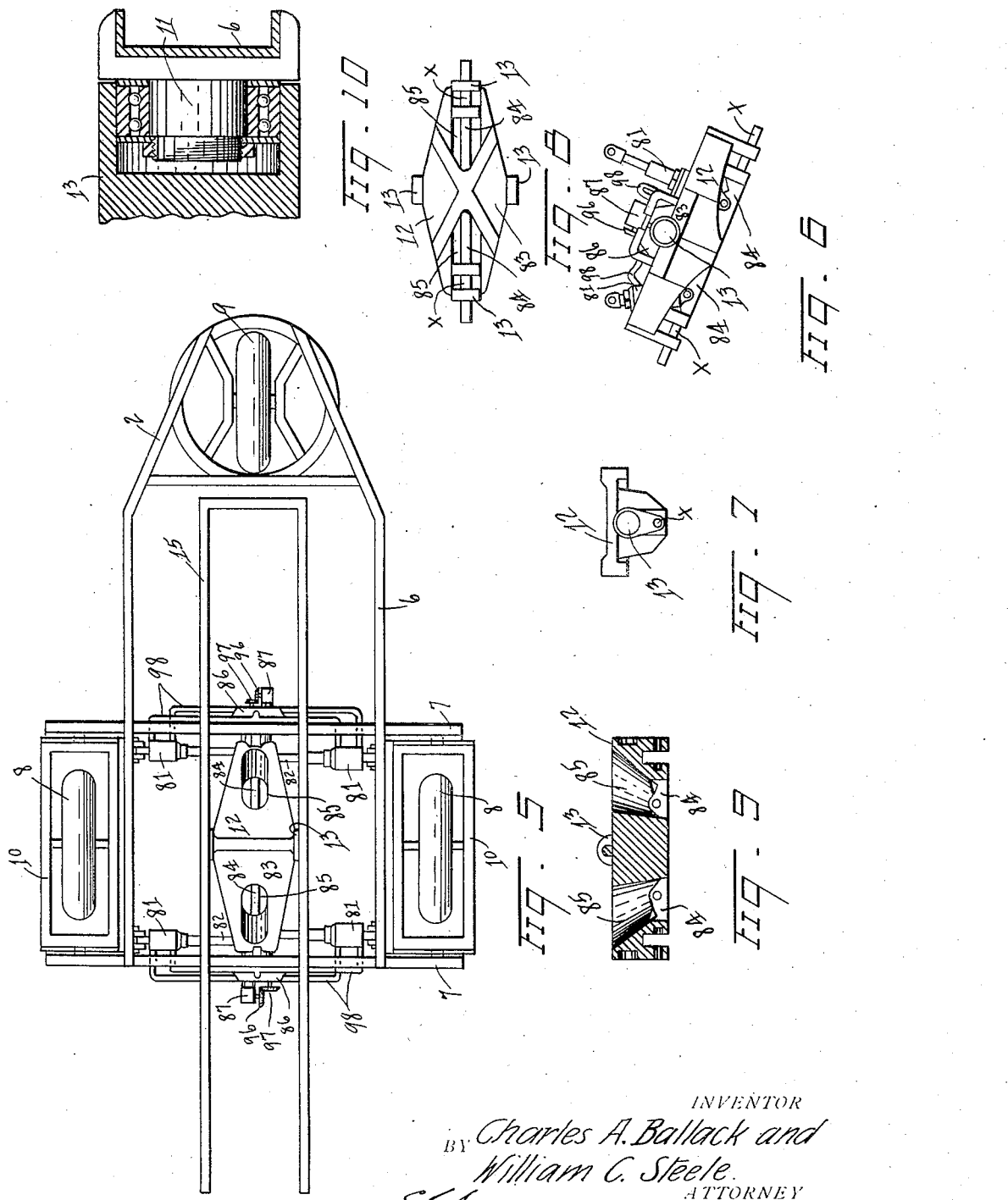

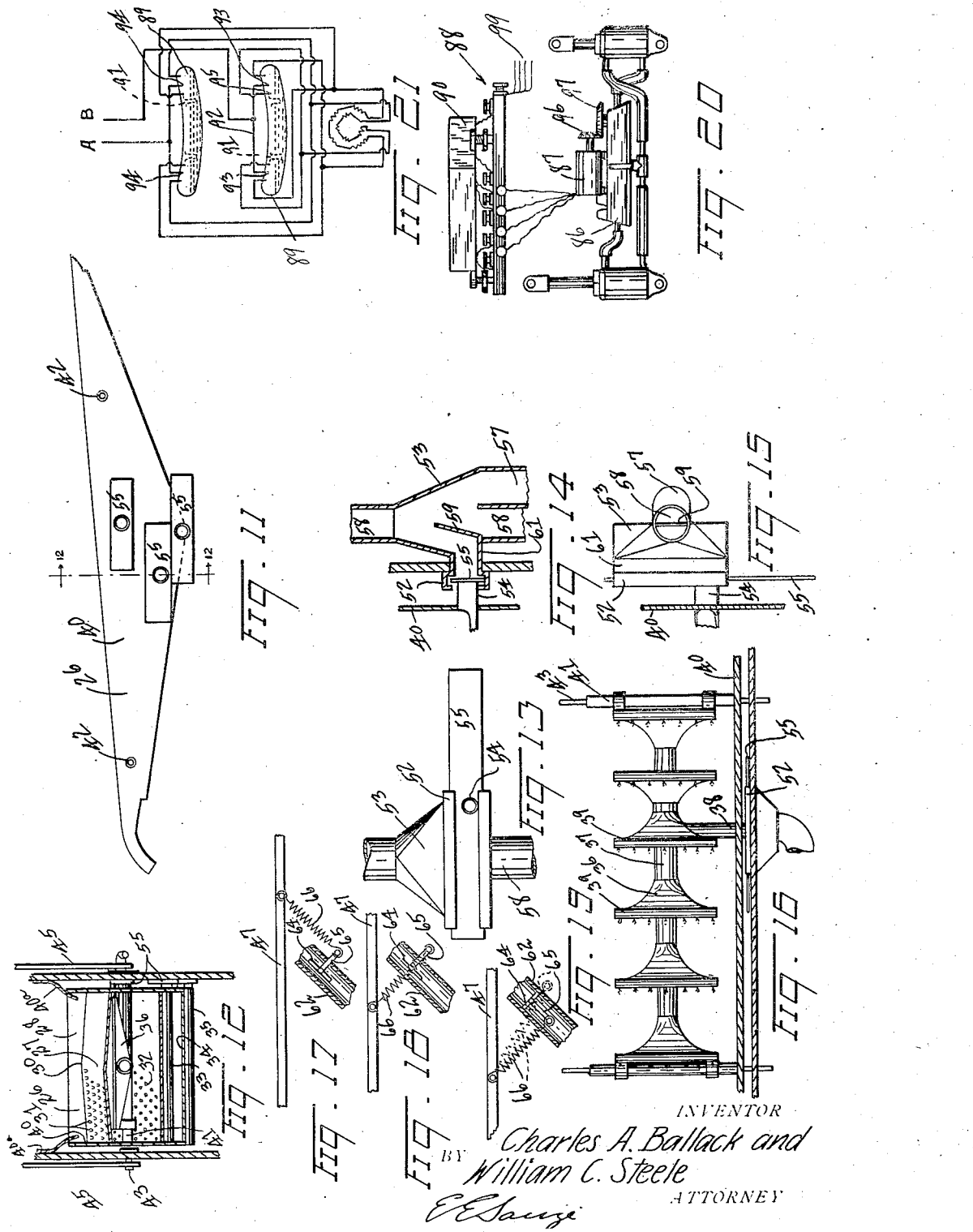

Patented Apr. 13, 1937

2,076,523

UNITED STATES PATENT OFFICE 2,076,523

HARVESTER-THRESHER

Charles A. Ballack, Walla Walla, and William C. Steele, Seattle, Wash.

Application August 13, 1934, Serial No. 739,590

5 Claims. (Cl. 130—27)

This invention relates to harvesters having for its purpose the threshing of grains, more particularly wheat, and has as one of its objects to provide a pneumatic harvester that as its name would imply, performs the various operations for the separation of the kernels from the straw substantially entirely by air.

Another object of the invention is to provide a harvester that begins its separating operation before the straw and cut heads reach the cylinder or first threshing element thereby increasing the separating area of the harvester without increasing its size.

A further object of the invention is to provide a harvester that will thresh and clean the grain in like successive steps until complete separation occurs.

A further object of the invention is to provide a harvester that will gather the chaff from the various steps of operation and combine all chaff for discharge from a single or common outlet.

A further object of the invention is to provide a harvester that will distribute the chaff over the original swath from which it was cut as a natural fertilizing expedient, or in a wind row.

A further object of the invention is to provide a harvester that will remove the weed seeds from the chaff for future disposition.

A further object of the invention is to provide an automatic leveling means that is essential to the successful and efficient operation of the harvester.

With these and other objects in view reference is now had to the accompanying drawings in which Fig. 1 is a side elevation of the harvester;

Fig. 2 is a front elevation of a fragment of the harvester with the steering wheel removed;

Fig. 3 is a sectional vertical elevation of the separating and conveying system;

Fig. 4 is a plan view in section of the chaff distributor;

Fig. 5 is a plan view of the chassis of the harvester showing location of transverse leveling jacks;

Fig. 6 is a side elevation of the leveling spider in a tilted position;

Fig. 7 is an end elevation thereof;

Fig. 8 is a plan view thereof from below;

Fig. 9 is a vertical sectional elevation thereof;

Fig. 10 is a sectional view, enlarged, of a spider bearing;

Fig. 11 is a side elevation of a conveyor;

Fig. 12 is a cross section of the conveyor taken on the line 12—12 of Fig. 11;

Fig. 13 is a side elevation of a flexible coupling;

Fig. 14 is a vertical sectional elevation thereof;

Fig. 15 is a plan view thereof;

Fig. 16 is a plan view of an impeller;

Fig. 17 is a side elevation, partly in sections, of the pulsating damper in the open position;

Fig. 18 is a similar view to Fig. 17 showing damper ready to close;

Fig. 19 is a similar view to Fig. 17 showing the damper closed;

Fig. 20 is a side elevation of the automatic leveling control; and

Fig. 21 is a wiring diagram of the automatic control.

Having referred to the drawings like numerals refer to like parts throughout the several views and the numeral 1 refers to the harvester as a whole and which comprises in general a chassis 2, a housing 3, standard suction and blast fans which will be specifically mentioned, and dust collectors serving as a feeder separator 4 and a grain cleaner 5 respectively which with other parts will now be specifically described.

The chassis 2 is of vehicle nature and consists of a chassis frame 6 supported rearwardly by a transverse frame 7, in turn supported by vehicle wheels 8 in a manner to be explained, and supported at its forward end by a steering wheel 9 of usual construction and installation.

The transverse frame 7 is extended perpendicular with and beyond the chassis frame 6 and has pivoted at both ends thereof with their axis longitudinally of the frame 6, a pair of wheel frames 10 in which is mounted in the usual manner supporting or traction wheels 8 adapted with the steering wheel to provide vehicle frame having a three point support for the harvester 1.

Mounted on stub shafts 11 attached to each oppositely positioned transverse frame member 7 is a spider 12, a typical mounting for which may be as shown in section in Fig. 10, and the bearings 13 therefor are disposed with relation to the frame to provide for a pivoted movement of the spider about an axis longitudinally of the chassis frame 6.

The spider 12 is also equipped with similar transversely positioned bearings 13 to provide an axis perpendicular thereto, and mounted thereon and extended upward are triangularly shaped plates 14 intended to be rigidly secured to the housing frame 15 which, by means of the spider and its longitudinal and transverse bearings, now permits of universal movement of the housing with respect to the said chassis.

The housing frame 15 is substantially supported at its center of gravity by the spider 12 and has mounted thereon in any substantial manner the housing 3 above referred to.

A leveling device secures the housing and housing frame in a vertical position at all times and will be presently explained.

Secured to the front of the housing is a feeder 16 which consists of a feeder box 17 (represented by the rectangular figure in Fig. 1), a feeder fan 18 and the feeder separator 4, the whole thus providing a complete separating unit for feeding, threshing in and by the fan, and cleaning in the separator and cleaner.

The feeder box 17 receives the cut grain (not shown) and a suction pipe 19 connects the box with the feeder fan 18 which draws the cut grain thereinto and forces it to the feeder separator 4, (preferably mounted on top of the housing to deposit directly into the machine) whence falling against a directing plate 20 and being directed thereby into the threshing element or cylinder 21, threshing in the usual manner occurs.

In the fan 18 a severe beating action takes place that will shatter much of the grain and release the grain kernels, and that will reduce much of the accompanying straw to chaff.

The feeder separator 4 is of the well known "dust collector" type and will not be specifically described, let it suffice however that a whirling movement of the air is set up therein that will permit the heavier particles to fall under the influence of gravity to enter the funnel-like bottom 22 structure wherewith to be directed downward into the housing interior, while the chaff will, under the influence of an air blast, be forced upward for removal in a manner to be described.

It will now be noted that much separation occurs in the feeder 16, and before entrance of the material to be threshed to the cylinders 21, hence the appropriate terms "separating feeder" and "cleaner" to be used.

The threshing elements 21 are rotatably mounted in the housing and are of the usual cylinder type, as shown, and includes the cylinder proper, concaves 23, and the directing plate 20, associated with the first cylinder is disposed to properly direct the material to be threshed from the feeder 16 to one of the cylinders 21, disposed in receptive relation thereto, when threshing will occur in the usual manner by power exerted by any suitable means such as a gas engine represented as at 24, power being communicated by belting 25, the latter being twisted, as shown, where necessary to reverse rotation, the reason for which will now be explained.

A plurality or multiplicity of cylinders 21 may be employed and for compactness will be placed in each end of the housing and progressively, and in staggered relation vertically with each succeeding cylinder dropped to a plane below its predecessor.

By this arrangement considerable distance may be confined in a relatively small space, and by the difference in levels permit gravity to assist conveying the threshed conglomerate to and from the respective cylinders (the term conglomerate being used to designate the material as it leaves a cylinder and in its mixed state, and which is not shown).

The number of threshing elements 21 shown is three and with the feeder fan 18 forming one threshing element the harvesting operation may be considered as being divided into steps, the number of steps equaling the number of threshing elements, and each step as shown including the threshing means 21, an enclosed reciprocatable conveyor, and a pneumatic cleaning means to separate the kernels and chaff, the conveyor and cleaning means as used, to progressively follow the cylinders proper, being now explained.

The conveyor 26 is extended to establish a path of travel between elements 21 and in addition to carrying the conglomerate is so placed with relation to the respective directing plates 20 that the conglomerate will be fed over the succeeding cylinder to fall upon its respective directing plate to thereby reverse the conglomerate from its former position to enter the cylinder in an inverted position. Thus the heavier elements of the conglomerate falling to the bottom on the conveyor will enter the cylinder first and as a result will be backed by a cushion of straw that will help prevent cracking of the kernels and distribute the kernels more evenly over the succeeding conveyor after passing through the cylinder.

For this purpose the conveyor consists of a screen plate 27 arranged to form the top of the conveyor and is extended between the successive threshing elements 21, with a slight inclination downward toward the succeeding cylinder, and at its upper end it is provided with an upwardly directed curvature 28 substantially concentric with and enclosing the concave 23 of the preceding cylinder, and for that purpose is placed below that cylinder, and the lower end projects over the succeeding cylinder with a similar but reversed curvature, as at 29.

The screen plate 27 is fashioned with a central bend providing a longitudinally disposed raised portion 30 to the plate whereby to afford a sloping surface directed laterally from the center to both outer edges for distribution purposes upon agitation of the conveyor.

The screen plate 27 is perforated to provide a screen adapted to pass the grain kernels and is preferably of the lip screen character, with the lips 31 thereof directed away from the preceding cylinder, or in the direction of travel of the conglomerate, for a purpose to be explained.

Enclosed beneath the lip screen 27, and secured adjacent to the ends thereof, is a seed screen 32 of the usual perforations and this screen is formed to provide a downward slope in two directions to bring its lowermost portion centrally below the lip screen 27 where it is provided with a grain outlet spout 33 transversely placed to direct the grain lodging therein to the side of the conveyor 26, and thus with the lip screen a grain kernel compartment.

Placed beneath the seed screen 32 in like manner is a seed pan 34, which forms with the seed screen a seed compartment, and which is provided with the same general inclination and likewise provided with a spout 35 adapted to direct the weed seeds to the side of the conveyor.

Between the screen plate 27 and the seed screen 32, in the grain kernel compartment, is a pneumatic impeller 36 supported and confined therein in a manner to be explained, and this impeller consists of a pipe 37 arranged to distribute blasts of air throughout the length and breadth of the under side of the conveyor and comprises an inlet pipe 38 which is connected perpendicularly with the distributing pipe 37 substantially paralleling the screen plate 27 longitudinally.

A series of nozzles 39 are taken off of the distributing pipe 37 at spaced intervals, the nozzles being extended transversely and having their nozzle orifices, (not shown) directed upward and away from the preceding cylinder, i. e. in the general direction of travel of the conglomerate, guided by the lips of the lip screen.

Side walls 40 are now added to the conveyor whereby to enclose the impeller 36, and also the seed screen 32 and the seed pan 34, and while these walls 40 confine the grains and seeds in their respective compartments they also prevent the issuance of any of the air from the impeller except through the orifices of the lip screen, together with a relatively small amount however attempting to pass out of the respective discharge spouts 33 and 35 and which will be utilized to assist in the discharge therefrom, through the side wall 40, in and through which the spouts are tightly secured, as is also the inlet pipe 38 of the impeller 36.

Longitudinally disposed straps 40 of a preferably flexible material are secured to the housing walls to lay over the side walls of the conveyor whereby to prevent dust and chaff, caused by the said wind blast, falling outside of the conveyor.

The conveyor 26 is reciprocated longitudinally and for the purpose of agitation a supporting pipe 41 is passed through the side walls 40 of the conveyor, at each end thereof, and is secured therein in any suitable manner (not shown), as represented in Fig. 11 by the smaller concentric circles 42, a rod 43 is then passed through the supporting pipes 41 and through slots 44, shown in Fig. 1, to be supported at each outer end by hangers 45, as represented in Fig. 12, which are pivotally attached to the housing walls as at 46 with a connection rod 47 and pitman 48 connecting the hangers 45 in the usual manner of such movements, to its complemental eccentric 49, the eccentrics being set preferably at 120 degrees with each other for obvious reasons and driven by a chain belt 50 in turn driven from the shaft 51 of one of the cylinders.

By this arrangement of the supported parts it is obvious that by removing the rod 43 that the conveyor may be withdrawn through the rear end of the machine if necessity requires, provisions of the usual character (not shown) being provided therefore.

As the grain and weed seed spouts, as well as the inlet 38 to the impeller 36, must communicate with the outside of the housing 3 and as these parts are rigid with the conveyor 26 which has a reciprocating motion for agitation puposes, and the housing wall is relatively stationary, a flexible means must be provided to establish communication with the outside and this means consists of a guide 52 or runway that is secured within the housing wall through which it is projected to unite or be formed integral with a boot 53, which latter may be of different forms depending on the work for which it is intended, a description thereof being provided as the different forms occur.

The grain and weed seed spout outlets are made cylindrical at the conveyor wall, as shown at 54, and these outlets extend to enter between the guide ways 52, (as shown in Fig. 14) and has mounted on the ends thereof a sliding valve 55 consisting preferably of a strip of leather or similar material through which the outlets pass to become flush with the outer guide ways 52 for movement longitudinally therein, whereby loss of air will be reduced to a minimum.

It is now obvious that with the conveyor supported to swing on the hangers 45 that movement of the conveyors will be in the arc of a circle and that therefore the valves will have the same movement in the guides and for that reason the guide ways are made wider than the valves (see Fig. 14) to provide for vertical play of the valve therein due to the movement thereof just mentioned.

In the case of the rods 43 themselves the guideways may be dispensed with, the valve merely contacting the wall of the housing, and being slidingly mounted on the rod for proper and automatic adjustment thereon whereby chaff, under the influence of the air that will be in the housing, will not be blown therethrough.

Referring now to Fig. 1 the relatively large circular figure shown in solid lines represents the elevator fan 56 which will be driven by any suitable means, or as shown, to provide a relatively large volume of air or wind which will be discharged through its outlet and from which three (in this case) feed pipes 57 convey the air to the diagonally placed pipe which will form a grain elevator 58. The feed pipes 57 connect with the boot 53 (see Fig. 14) and by the force of the air therein and passing the tongue 59, will create a suction that will withdraw the grain from the conveyor 26, assisted by the aforementioned air pressure in the conveyor, and force the grain upward and into the grain cleaner 5 located on top of the housing 3, from whence the grain will be deposited in the usual manner either to a bulk container, not shown, or to the sacker head 60 disposed on the side of the machine or other common outlet.

For the above purpose of suction the boot consists of a transition piece 61, leading from the runway 52 forming part of the said valve, and this piece is formed to provide the upwardly extended tongue 59, within the boot and in the path of the elevator with which the boot connects, and the feed pipe 57 enters the boot at an angle to both the tongue and the elevator, to raise the grain in the usual manner of such device.

From each of the feed pipes 57 a branch pipe 62 connects with an impeller boot 63 from whence the air is directed to the impeller and a system of dampers 64 automatically controls the flow of air to the impeller in a manner to be presently explained.

The impeller boot is provided with a similar guideway to that of the elevator boot and tapers from the valve to terminate in and connect with said branch pipes 62.

As above described the conveyor has a reciprocating motion and obviously the motion of the said connecting rod 47 is identical being secured thereto for the purpose of imparting that motion.

Figs. 17, 18, and 19 show on an enlarged scale and in section the automatic control through one cycle of operation.

The parts shown consist of the connecting rod 47, the three pipes 62 and the respective dampers 64, each damper being provided with a relatively short lever handle 65 to permit of rather rapid movement of the damper.

To the end of each handle is secured one end of a spring 66 while the other end of the spring is secured to the connecting rod 47.

By referring to Fig. 17 the connecting rod is presumed to be at the beginning of the cycle and the tension of the spring is now holding the damper of this pipe open. Movement to the left, to the position shown in Fig. 18, will bring the spring on center with the handle, without effecting immediate movement of the damper, but further movement of the connecting rod in the same direction will move the spring past center and to the position shown by the dotted lines in Fig. 19, when the tension of the spring will rapidly open the damper. The reverse movement of the connecting rod will close the damper in like manner, both movements being rapidly executed.

Assuming that the Figs. 17, 18, and 19 portray the movement in the direction of travel of the conglomerate it is now apparent that in this cycle of operation the damper will remain open until just before the connecting rod reaches its destination and with the damper open that a blast of air, provided by the fan 56, will issue from the impeller to pass through the lip screen, the lips thereof, by the direction of their bend, directing the air generally toward the succeeding cylinder until just before the conveyor reaches its forward destination when the air will be stopped permitting the grain to fall to rest on the return movements of the conveyor caused by the action of the dampers and providing a pulsating effect to the air.

By this means the conglomerate will be agitated both mechanically, and vertically by air, and the conglomerate will be lifted bodily into the air with a forward movement as the conveyor moves forward and will drop back to the plate 27 as the conveyor returns, thereby alternately raising and dropping the conglomerate to cause an advance and at the same time a separation of the grain therefrom, the grain then falling through the meshes of the lip screen.

Obviously the weed seeds will fall through the lip screen plate with the grain when the grain will remain on the seed screen, gradually to enter the discharge spout, while the seeds will fall through the weed screen to fall onto the seed pan for discharge through the medium of the seed spout, to the seed spout 35, or other common outlet, induced by the air pressure in the seed compartment.

Obviously the seed spout is connected with the conveyor with a boot and valve in like manner to the grain elevator and the spout terminates at its lower end in the seed box 67 that may be emptied periodically.

Each cylinder has its own conveyor which follows it and by thus threshing, cleaning and conveying provides a complete unit, or step in the method of operation, and each cylinder is provided with its own directing plate so that the conglomerate left after separation in one step will be directed to the succeeding cylinder in reverse order as above mentioned.

To complete the harvesting operation a shoe of the usual type, and represented as at 68, is provided and this shoe is preferably made integral with the last conveyor for agitation with that member, and to assist in the final cleaning the impeller of this conveyor is extended into the shoe, whence by the direction of air toward the rear end of the harvester the final cleaning will occur.

On the opposite side of the housing from the elevating fan 56, and shown partly dotted in Fig. 1, is a gathering fan 69 that is preferably connected for operation directly to the respective cylinder shaft 51, and a chaff suction pipe 70 shown partly dotted in Fig. 3 is directed to the top of the housing, above the conveyors, where it is positioned to gather the chaff from the agitated conglomerate, by means of a hood 71, and a branch suction pipe 72 is extended therefrom to the feeder separator 4 and a second branch 73 passes to the grain cleaner to gather the chaff from these members.

A second step suction pipe 74 and gatherer shown dotted in Fig. 1, terminates in a similar hood 71 and is positioned to draw from above the chaff from the second step conveyor through the side wall of the housing, (see Fig. 3) and to the same fan 69, while the third step is opened to the atmosphere in the usual manner of threshing machines and will require no gatherer as the chaff remaining will be discharged off the end of the shoe 68, in the usual manner.

These gatherers now draw the chaff to the gathering fan 69 and a chaff discharge pipe 75 therefrom (shown dotted in Fig. 3) terminates in a discharging spreader 76, a common discharging outlet, shown in section in Fig. 4, which is placed beneath the shoe 68, beyond which it is projected as at 77, to catch any falling chaff from the fingers 78 of the shoe to direct the discharge rearwardly.

The spreader 76 is provided with a series of dampers or movable baffles 79 and these are placed therein where by proper manipulation the discharge may be directed or spread out fan like and the chaff distributed over the swath from which it was originally cut i. e. the entire width of the cut swath rather than merely the width of the housing, eventually leaving no row of undue thickness on the ground.

The grain elevator 53 works on the order of an inspirator the partial vacuum caused by the rapidly rushing air drawing the grain into the path of the rushing air to be forced upward and into the cleaner 5, where any of the lighter particles of chaff will be drawn off through the second branch 73 for discharging and the clean grain finally being discharged into a sack 80.

As much of the success of the device depends upon the conveyors remaining level laterally, and at the same angle of inclination longitudinally at all times, an automatic leveling means is provided which consists preferably of hydraulic jacks 81 disposed about the spider 12 to maintain the level of the housing, and by referring to Fig. 5 it will be noted that two pair of oppositely positioned jacks are pivotally secured to the longitudinal bars of the chassis frame and have their plungers 82 extended and pivotally connected with the spider 12, (or with the housing frame 15 as the case may be) in a manner to be explained.

The spider 12 referred to in the beginning of the specifications consists of a substantially flat plate 83 having ribs on its under side for strength, one of which ribs extends longitudinally thereof and the plate is provided with apertures 85 formed above this rib, as shown plainly in Fig. 5, and these apertures are disposed to accommodate other jacks 81 in the position in relation to the housing frame shown in Fig. 1 wherein the jacks are shown dotted, and in Fig. 6, and whereby leveling may be accomplished readily.

Offset from the center of the longitudinal bearings of the spider and depending therefrom is a short shaft X with which the lateral jacks connect to level the spider laterally, and this shaft is extended to pivotally receive the connecting rods Y extended to pivotally connect with the depending plate Z of the wheel frame whereby the vehicle wheels will be maintained parallel with the housing at all times.

To operate hydraulic jacks a pump, contained in a case 86, is located to connect with two oppositely placed jacks whereby the actuating fluid will be withdrawn from one of the jacks to be forced into its complemental jack, to extend one jack and simultaneously retract the other.

The pump is operated preferably by a reversing motor 87, preferably mounted on the pump, and the motor is wired to an electric generator, (not shown), and is rotated in one direction, stopped and reversed, by an automatic control 88 which will now be described.

The essential parts of the control are two pairs of level bulbs 89, each pair being placed perpendicular to the other pair, the whole being preferably combined in an instrument case represented as at 90.

At each end of each bulb electrical contact points are inserted to be joined electrically and selectively by the mercury or other fluid of the bulb. When the bulbs are tipped and when the fluid contacts those points as a result of the tipping, with the control secured say to the housing of the harvester, any movement thereof away from the horizontal will tip the bulbs and make the contact mentioned.

It will be found that chuck holes, ditches, washes or the like will move the harvester from the horizontal with a sudden movement that will be corrected almost immediately and that while the efficiency of the conveyors has not been effected in the short interval of time yet a sudden reversion of the motor might be detrimental to that unit, therefore to overcome such a condition baffles 91 (shown dotted) are provided in the bulb, before the points, whereby a small hole is left through which the fluid can more slowly flow in its effort to contact the said points.

By this means the harvester must needs have changed from the horizontal for the full period of time required for the liquid to pass under the baffles and span the said points, the length of time elapsing between contacting both pairs of points being preferably such as will permit the motor to come to a full stop before being reversed. With this in mind the wiring diagram shown in Fig. 21 of the drawings will now be explained:

In the diagram in Fig. 21 the upper two leads A and B are presumed to come from the generator and the lower four leads, representing four wires leading to the motor the two outer wires of the four representing the leads to the field and the two inner wires thereof representing the leads to the armature.

Both the upper or generator leads and the lower or motor leads finally terminate in the bulbs to provide a set of three contact points at each end of both bulbs.

This diagram will provide a control for the operation of leveling the machine in one direction and an additional control placed with the bulbs positioned perpendicular to the position of the bulbs just mentioned and providing a control for a second motor whereby to level the machine in a similar manner to the first mentioned leveling. Both devices are preferably formed as a unit and the description of the wiring for one will answer for both.

Following the lead B down to the branch 92 we find that this terminates within the respective ends of the lower bulb to form what will be lead points 93 therein while the lead A from the motor is similarly disposed with respect to the upper bulb and provides lead points 94 therein.

With the flow from B to A and with the right hand end of the bulb lowered whereby the leveling fluid will contact the now low sets of contact points the flow will extend from the lead point 93 of B to the armature point 95 positioned adjacent and on the left of the lead point 93 of the lower bulb and hence with contact established between these two points with the flow will follow to and through the armature wires and will be prevented from continuing to the high end of the bulb owing to the fact that the circuit is broken at that end of the bulb, therefore from the point of juncture with the before mentioned armature lead the current will pass through the armature to the second interior wire which forms a junction with a wire running upward and into the low end of the upper bulb there to form a contact by means of the said fluid with the lead point 94 of the lead wire A thus completing the circuit through the armature winding.

Beginning again with the lead from B and its lead point 93 and contacting the point thereof we find following this wire that it connects with one of the outside wires before explained as being a field wire and passing downward through this wire and through the field to the opposite outside wire thence going upward to the branch and following the branch to a point adjacent to and to contact the lead point from the lead A.

With this system of wiring when the bulbs are level no current can flow to the motor and that when one end of the bulbs are low that circuit is established through both the field winding and armature winding.

The wiring connected with the other end of the bulbs reverses the direction of flow as will be noted thereby reversing the direction of rotation of the motor.

Obviously other wirings may be resorted to if deemed expedient.

Referring now to Fig. 20 it is presumed that the motor terminates in a beveled pinion 96 which is operably connected with a bevel gear 97 which in turn is connected with and rotates a pump, not shown.

From this pump and case 86 flexible pipes 98 connect with the jacks in the usual manner whereby when the pump rotates in one direction the fluid of the jacks will be moved to permit one plunger to be retracted while the opposite one is projected.

The jacks operate in pairs and each jack of a pair operates in a reversed manner to its fellow whereby one pump mechanism will suffice for two jacks. In this application both longitudinal and transverse movement must be corrected, therefore two pairs of jacks are utilized and for that purpose an extra set of leads is shown as at 99 and are intended to operate the pump of the second pair of jacks.

In use, and as has been partly explained as the specifications have proceeded, the cut grain will be delivered to the feeder box in any suitable manner but it may here be explained that the design shown in Fig. 3 is merely used to typify any receiving means, the purpose being to provide a header which will supply grain to the feeder fan directly and which will form the subject of a separate application for Letters Patent.

As the grain is drawn into the feeder fan it obviously comes into contact with the revolving blades of the fan (not shown) which is intended and which accomplishes a certain amount of threshing, or at least shattering of the grain heads, and mutilation of the straw therewith, with a result that as the conglomerate reaches the feeder separator located on top of the housing a first separation has occurred which besides removing the lighter particles also removes any dirt or dust, together with smut or other undesirable particles, whereby the remaining wheat and heavier particles only will be directed to the first cylinder thus lessening to a considerable degree the load ordinarily placed on this cylinder.

Leaving the cylinder the conglomerate is then scattered over the screen plate for equal distribution thereon, aided by its sloping surface, which plate being agitated, and with the lips directed away from the cylinder, tends to move the threshed matter toward the second cylinder over which it is passed to fall reversed against the directing plate of the second cylinder for a second threshing.

In the meantime however a pulsating blast of air has been forced upward through the lip screen forming this plate, and the air being directed to a greater or less degree by the slope of the lips of said screen thus tends to raise and let fall and also impel forward the conglomerate, with a result that the lighter particles will be thrown upward to a plane above the heavier to be sucked into the gathering fan while the grain will fall between pulsations to and through the screen to drop onto the weed screen positioned therebelow.

The weed screen being of finer mesh permits the weed seed to fall through and onto the seed pan thus separating the weed seeds from the grain.

The weed screen and the seed pan are provided with a centrally positioned discharge spout which is connected flexibly with a boot as before described the weed seeds falling by gravity through the seed chute into a conveniently located seed box while the grain will be directed into an elevator by means of a suction created in the usual manner at the boot of the respective grain spouts, aided by the pressure of air in the conveyor, to be forced upward to the grain cleaner also preferably positioned on top of the housing where it is provided with an outlet which terminates in a sacker head, from whence it will be sacked as represented in Fig. 2.

The feeder separator and grain cleaner are connected with the cleaner fan as above described and the cleaner fan is provided with the chaff discharge pipe discharging into the spreader which is positioned below the shoe of the machine and which is provided with dampers which directs the discharge from the spreader with the intent that the discharge may be in a narrow row or diverged to cover the swath from which it was originally cut.

Withdrawal of the lighter particles takes place before entrance of the heads into the first cylinder, from the first conveyor, and from the second conveyor, the latter being taken from the side of the housing as represented in Fig. 3.

There is no cleaner connected with the last conveyor, this conveyor being open to the outside atmosphere while the first two conveyors are closed. This has as its reason that by the time the conglomerate reaches this third step that there is practically nothing left of an objectionable nature, and to finally recover any of the threshed grain which may have reached the end of the last conveyor the shoe is provided with a reversed inclination to that of this conveyor this will turn back the grain and assisted by the impelling blast of air the lighter particles will have passed over the rear end to fall between the fingers and to be caught in the blast from the discharging spreader.

Having thus described our invention we claim:—

1. In a harvester, the combination of a housing, a feeder communicating with the interior of said housing, an air supplying means, and a multiplicity of threshing cylinders progressively positioned in said housing, and disposed with one of said cylinders positioned in receptive register wth said feeder, and disposed with each succeeding cylinder in a plane below its predecessor, a directing plate associated with each cylinder, a reciprocating closed conveyor operably supported in said housing and disposed to connect successive cylinders, and comprising an inclined screen plate consisting of a lip screen having its lips inclined in the direction of travel of the conglomerate, a seed screen disposed below said lip screen and forming therewith a grain kernel compartment, a grain outlet in said compartment, and a seed pan disposed below the seed screen and forming therewith a seed compartment, and provided with a seed outlet, a pneumatic impeller confined in said grain kernel compartment and arranged therein to provide blasts of air through said lip screen to direct the air to impel progressively the conglomerate, for the separation of the kernels and chaff; to provide air therein; to assist discharge of the grain kernels through the grain outlet; and to provide air to the seed compartment to assist discharge of the seeds through the seed outlet, a like conveyor extended in like progression from the final cylinder, and terminating in a shoe formed integral with said like conveyor, a pneumatic impeller contained therein and extended into the said shoe, means to reciprocate said conveyors, and means cooperable with the reciprocating means to automatically pulsate the air blasts of the impellers, a pneumatic cleaning means established above the conveyors, and cooperable with said blasts of air to remove the straw and chaff therefrom by suction, means to pneumatically assemble the discharge from the compartments of the respective conveyors for discharge from a common outlet, and a directable discharging spreader terminating said cleaning means and providing therefore a common outlet from the several conveyors.

2. In a harvester, the combination with a housing, a feeder communicating with the interior of said housing, and a multiplicity of threshing cylinders in said housing, and disposed with one of said cylinders positioned in receptive register with said feeder, and with each succeeding cylinder positioned in a plane below its predecessor, a directing plate associated with each cylinder, an agitatable enclosed conveyor operably supported in said housing and comprising an inclined screen plate arranged to form the top of said conveyor and consisting of a lip screen having its lips inclined in the direction of the travel of the conglomerate, a seed screen positioned with respect to the lip screen to provide an enclosed compartment and contain the loosened grain kernels, and a seed pan disposed below the seed screen to provide an enclosed compartment to contain the weed seeds, and extended between and in communication with successive cylinders, and provided with an extended end disposed to receive from a preceding cylinder and having its remaining end disposed with relation to the succeeding cylinder, and its directing plate, to deliver the conglomerate inverted thereto, a pneumatic impeller contained within said conveyor and arranged therein to provide blasts of air through said screen to be directed thereby to impel progressively the conglomerate, and simultaneously separate the kernels and chaff, and to assist in the discharge of the kernels and weed seeds from the respective compartments of said conveyor, a like conveyor extended in like progression from the final cylinder and provided at its discharge end with a shoe, and containing an impeller extended into the shoe, means to pulsate said blasts of air, means to reciprocate said conveyor and said shoe, pneumatic cleaning means established above said conveyors for cooperation with said blasts of air to remove the straw and chaff from the several conveyors for discharge from a common outlet, means to pneumatically remove the kernels from the compartments of the respective conveyors for discharge from a common outlet, and a chaff discharging means terminating said cleaning means.

3. In a harvester, the combination with a housing, a feeder communicating with the interior of said housing, a multiplicity of threshing cylinders progressively positioned in said housing and disposed with one of said cylinders positioned with receptive register with said feeder, and with each succeeding cylinder positioned in a plane below its predecessor, a directing plate associated with each cylinder, of a conveyor supported in said housing and provided with an inclined screen plate extended between and in communication with successive cylinders, and provided with an extended end positioned below and to receive from the preceding cylinder, and having its remaining end positioned above the succeeding cylinder and with respect to the directing plate thereof to deliver the conglomerate inverted thereto, and provided with compartments formed therein, a pneumatic impeller contained within said conveyor, and arranged therein to provide blasts of air through said screen to be directed thereby to impel progressively and simultaneously separate the kernels of grain and chaff, and to assist in the discharge of the kernels and weed seeds from the respective compartments of the said conveyor, a like conveyor extended in like progression from the final cylinder, and provided at its discharge end with a shoe, and containing an impeller extended into the shoe, means to automatically pulsate said blasts of air, means to reciprocate said conveyors and said shoe, a pneumatic cleaning means established above conveyors to remove the straw and chaff by suction therefrom for discharge from a common outlet, and means to pneumatically discharge the kernels from the respective conveyors for discharge from a common outlet.

4. In a harvester, the combination with a housing, a feeder communicating with the interior of said housing, and a multiplicity of threshing cylinders progressively mounted in said housing and disposed with one of said cylinders positioned in receptive register with said feeder, and a directing plate associated with each cylinder, enclosed conveyors separately and reciprocatably supported in said housing and extended between successive cylinders, and having one end extended below and to receive from a preceding cylinder, and its remaining end extended above the succeeding cylinder in cooperable relation with the directing plate thereof to deliver the conglomerate thereto inverted, and provided with an inclined screen plate having a central bend providing a sloping surface to both outer edges adapted, upon reciprocation to distribute the conglomerate both longitudinally and laterally thereon, a pneumatic impeller associated with said conveyor and disposed to provide blasts of air through and directed forwardly by the inclined lips of said screen plate, a shoe incorporated with one of said conveyors, means to reciprocate said conveyors and said shoe, a pneumatic cleaning means established above said conveyors to remove the straw and chaff by suction therefrom for discharge from a common outlet, and means to pneumatically discharge the kernels from the respective conveyors for discharge from a common outlet.

5. In a harvester, the combination with a housing, and a feeder disposed in operable communication with the interior of said housing, of threshing cylinders mounted progressively in the front and rear ends of said housing, and provided respectively with directing plates, and having one of said cylinders positioned in receptive register with said feeder, of enclosed conveyors, adapted to receive and contain the cleaned kernels, operably supported in said housing, and provided with an extended end disposed to receive from a preceding cylinder, and having its remaining end disposed and adapted to cooperate with the directing plate of the succeeding cylinder to deliver the conglomerate thereto inverted, a like conveyor associated with and to receive from the final cylinder and terminating at its remaining end in a shoe, a pneumatic impeller associated with each conveyor to separate the kernels from the chaff, a pneumatic cleaning means established above said conveyors to remove the straw and chaff by suction therefrom, for discharge from a common outlet, and means to pneumatically discharge the kernels from the respective conveyors for discharge from a common outlet.

CHARLES A. BALLACK.
WILLIAM C. STEELE.